Figure 1:
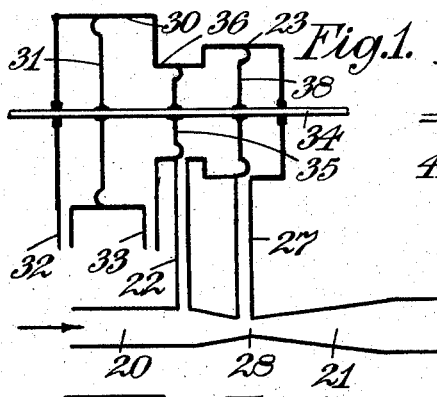

INVENTORS
C. L. JOHNSON,
F. W. W. MORLEY, &
D. O. DAVIES

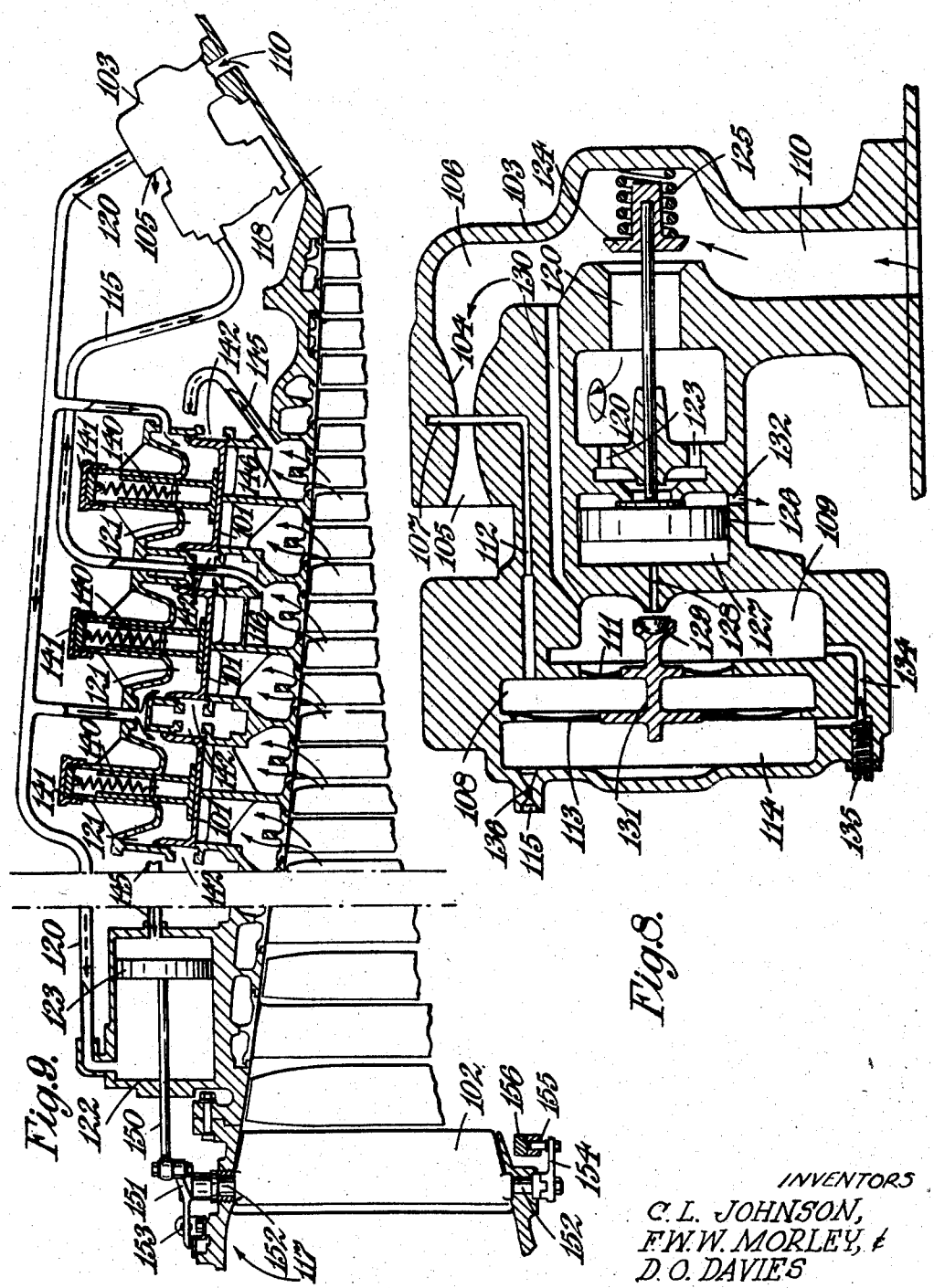

United States Patent Office 2,886,968
Patented May 19, 1959

2,886,968

DEVICES SENSITIVE TO THE RATIO BETWEEN FLUID PRESSURES

Christopher Linley Johnson, Allestree, Derby, Frederick William Walton Morley, Aston-on-Trent, and David Omri Davies, Edgware, England, assignors to Rolls-Royce Limited, Derby, England, a British company Application March 8, 1949, Serial No. 80,276

Claims priority, application Great Britain March 17, 1948

1 Claim. (Cl. 73—213)

This invention relates to devices sensitive to a selected value of the ratio between two fluid pressures. Such devices may be used to indicate when the actual value of the ratio is above or below the selected value or may be used to control or actuate mechanism in which a change has to be effected when the actual value of the ratio passes through the selected value.

Hitherto, such devices have been constructed according to the barometer principle. There are two main types of such devices, mercury and aneroid, and both these types depend upon a vacuum-containing chamber, which in the mercury type is situated above the column of mercury and in the aneroid type, is inside a capsule. Both these types suffer from a number of serious disadvantages when employed outside the laboratory, the main one being that they are not robust and the slightest puncture of the vacuum chambers renders them completely useless.

An object of this invention, is to provide a device sensitive to particular values of the ratio between absolute fluid pressures in which the necessity of the vacuum-containing chamber is obviated.

The invention employs chambers each having as part of its wall a displaceable wall, and the chambers are connected by pressure tappings to their appropriate pressure sources so that the pressure in each chamber is the same as that of the source to which it is connected. The displaceable walls are connected in any suitable way with a movable member and have suitable effective areas so that when the particular value of the ratio is attained the loads applied to the movable member are balanced. Thus, when the value of the ratio is below the particular value, the movable member will be urged to move in one direction, and when the value of the ratio is above the particular value, the movable member will be urged to move in the opposite direction.

By "a chamber having as part of its wall a displaceable wall" is meant such an arrangement a piston-and-cylinder device wherein the piston is a displaceable wall forming part of the wall of the cylinder chamber on one side of it. Another example of such an arrangement is a chamber having a flexible diaphragm in its wall.

By "effective area" of a displaceable wall is meant the area which a piston would have if the chamber having as part of its wall the displaceable wall comprised a cylinder with the piston as the displaceable wall.

The invention also employs a venturi tube which is choked in operation. When the flow through a venturi-tube is choked, i.e., the velocity of the fluid at the throat is equal to the local velocity of sound, the throat pressure is in a particular ratio to the absolute inlet pressure and is independent of the back pressure. The ratio is dependent on the nature of the gas flowing, and for di-atomic gases, it is theoretically 0.528, though in fact it has been found that for air the value is about 0.545, due to friction losses.

By modification of the dimensions of the venturi, and in particular by extending the axial dimension of the throat portion or by making the pressure tapping at a point separated by a small distance from the true aerodynamic throat, it has been found that for practical purposes the ratio may be given any convenient value in the range from about 0.30 to about 0.625.

It will be appreciated that if air is flowing through a choked venturi, the load on a piston or diaphragm, subjected to inlet pressure on one side and to throat pressure on the other will be approximately 0.455, multiplied by the effective area of the piston or diaphragm and the absolute pressure at the inlet of the venturi.

Several embodiments of the invention will now be described with reference to the drawings accompanying this application, of which:

Figs. 1-8 show devices for sensing when the ratio between two fluid pressures attains a particular value, and Figure 9 shows a part sectional elevation through an axial-flow compressor having bleed valves and adjustable inlet guide vanes controlled by a device as shown in Figure 8.

In the embodiments illustrated in Figures 1-8 it will be assumed that the absolute pressure of the inlet of the venturi-tubes is $p'$, that the absolute pressure at the throat is $p''$ and that the sonic ratio for the gas flowing is $k$, so that $p''=k.p'$.

Figures 1 to 8 show devices in which the displaceable walls are diaphragms which are interconnected by a connecting rod and in which the diaphragm structure so constituted is in one position when the ratio between one fluid pressure and a second fluid pressure is below a particular value, and is in another position when the ratio is above the particular value. It will be assumed in the description that the higher pressure is Q, the lower fluid pressure R and the preselected value of $$\frac{Q}{R}=m$$

Referring to Figure 1, it will be seen that a tapping 22 is led from the inlet 20 of a choked venturi 21 to the common chamber between a diaphragm 38 dividing a cylinder 23 so that it forms part of two chambers and a second diaphragm 35 dividing a cylindrical extension 36 of the cylinder 23. The chamber on the other side of the diaphragm 38 is connected by the tapping 27 to the throat 28 of the choked venturi-tube 21.

The effective area of the diaphragm 35 is $(1-k)$ times the effective area of the diaphragm 38 with the result that the load applied by the pressure $p'$ to the diaphragm 35 balances the load applied to the diaphragm 38 by piston 34, the pressure $p'$ on one side and $p''$ on the other.

To the left, the cylindrical extension 36 opens into a third cylinder 30 containing a third diaphragm 31. Pressure tappings 32, 33 are provided from the two fluid pressure sources, that from the lower pressure source being tapping 32 which leads to the chamber on the left of the diaphragm 31 and that from the higher pressure source being tapping 33 which leads to the chamber having as part of its wall both the diaphragm 31 and the diaphragm 35.

The three diaphragms are interconnected by the rod 34 and it will be seen that the diaphragm structure is urged to move to the left by a load equal to Q multiplied by the difference in the effective areas of the diaphragms 31 and 35, and that the diaphragm structure is urged to move to the right by a load equal to R multiplied by the effective area of the diaphragm 31, since there is no effective load due to the pressures $p'$ and $p''$ derived from the choked venturi-tube 21.

The diaphragm 31 is so dimensioned that it is larger than the diaphragm 35 and its effective area is $m$ times the difference between its effective area and the effective area of the diaphragm 35.

Thus it will be seen that when the selected ratio exists between the two fluid pressures, there is no effective load urging the diaphragm structure to move, but that when the ratio of the lower fluid pressure to the higher fluid pressure is below the preselected value, the diaphragm structure will tend to move to the left, and vice versa.

If the selected pressure ratio is very large, the diaphragm 31 has to be very little larger than the diaphragm 35 and very small changes in the dimensions of the diaphragms seriously upset the accuracy of the device.

Figure 2:
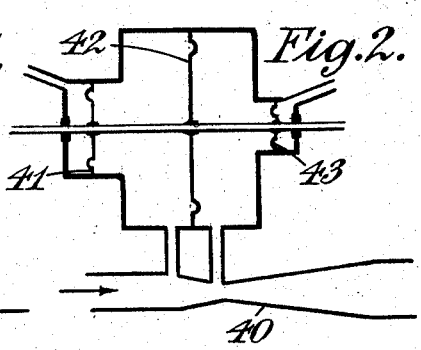

An embodiment which overcomes this defect is illustrated in Figure 2. In this embodiment, the lower of the two fluid pressures, R acts on the diaphragm 41, while the inlet pressure $p'$ of the choked venturi-tube 40 acts in the chamber between the diaphragm 41 and the venturi-diaphragm 42. The throat pressure $p''$ derived from the choked venturi-tube 40 acts in the space between the venturi-diaphragm 42 and the diaphragm 43, and the higher of the two fluid pressures Q acts on the other side of the diaphragm 43.

The dimensions of the three diaphragms 41, 42 and 43 are inter-related so that the effective area of the diaphragm 41 on which R acts is $m$ times the effective area of the diaphragm 43 on which Q acts, and so that the difference between the effective area of the venturi-diaphragm 42 and the effective area of the diaphragm 43, on which the throat pressure $p''$ acts is equal to $1/k$ times the difference between the effective area of the venturi-diaphragm 42 and the effective area of the diaphragm 41 on which the inlet pressure $p'$ acts; the venturi-diaphragm 42 being bigger than the diaphragm 41 which, in turn, is bigger than the diaphragm 43.

With this arrangement, it will be appreciated that the diaphragm structure is urged to move to the left when the ratio of Q to R is greater than the preselected value $m$ and to the right when the ratio is less than the preselected value.

When the source of the higher fluid pressure is also suitable to be the source of gaseous pressure for the venturi-tube, a modified form of the embodiment shown in Figure 1 may be employed. Such a modified form is illustrated in Figure 3.

It will be appreciated that the diaphragm 31 in Figure 1 is dimensioned in accordance with the dimensions of the diaphragm 35 and that the venturi-diaphragm 38 is also dimensioned in accordance with the diaphragm 35 so that the dimensions of the diaphragm 31 are fixed in relation to the venturi-diaphragm 38.

If the source of the higher fluid pressure is employed to supply the venturi-tube the pressure Q and the inlet pressure $p'$ are the same; and in the device shown in Figure 1, the diaphragm 35 will have the same pressure acting on both sides of it, and could therefore be omitted.

Figure 3:
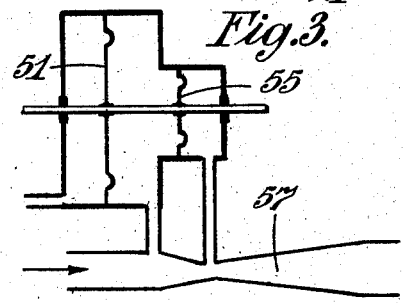

This has been done in the embodiment shown in Figure 3 in which the inlet pressure $p'$ of the choked venturi-tube 57 equal to Q, the higher of the two fluid pressures, acts between the diaphragm 51 and the venturi-diaphragm 55, the throat pressure $p''$ acts on the other side of the venturi-diaphragm 55, and the lower of the two pressures R acts on the other side of the diaphragm 51.

The effective area of the diaphragm 51 bears the same relation to the effective area of the venturi-diaphragm 55 as the effective area of the diaphragm 31 does to the effective area of the venturi-diaphragm 38 in the device illustrated in Figure 1, and so the diaphragm structures of the two devices will behave in the same way.

Figure 4:
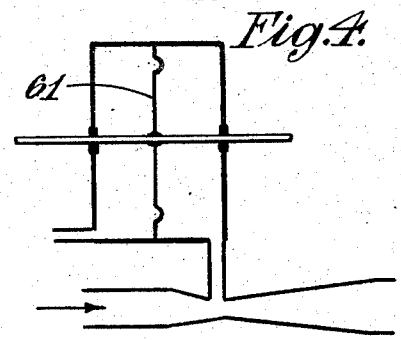

Figure 4 illustrates an embodiment of the invention which is suitable for the particular case when the preselected ratio $m$ is the same as the inverse sonic ratio $1/k$, and the source of the higher fluid pressure is suitable for supplying the venturi-tube.

In this embodiment only one diaphragm 61 is employed, subjected on the left-hand side to the lower fluid pressure R and on the right-hand side to the throat pressure $p''$. Since the inlet pressure $p'$ is the same as the higher fluid pressure Q and the selected ratio $m$ is the same as the inverse sonic ratio $1/k$, the lower fluid pressure R will be equal to the throat pressure $p''$ when the ratio of Q to R has the selected value $m$. When the ratio is less than the selected value the diaphragm 61 will be urged to move to the right and vice versa.

Figure 5:
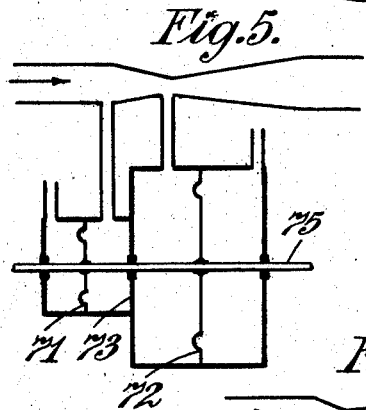

Figure 5 illustrates an embodiment of the invention which is suitable for the case when the preselected ratio $m$ is the same as the inverse sonic ratio $1/k$ but the source of higher fluid pressure is unsuitable for supplying the venturi-tube.

In this embodiment the higher fluid pressure Q acts on the left-hand side of the high-pressure diaphragm 71 and the inlet pressure $p'$ acts on the right-hand side of the high-pressure diaphragm 71. The lower fluid pressure R acts on the right-hand side of the low-pressure diaphragm 72 and the throat pressure $p''$ on the left-hand side of the low-pressure diaphragm 72. The chambers containing inlet pressure $p'$ and throat-pressure $p''$ are separated by a wall 73, through which the diaphragm-structure rod 75 passes in a substantially fluid-tight manner, by which is meant that a small amount of leakage may be tolerated if it is not sufficient to affect the ratio of the inlet pressure at the inlet to the pressure at throat of the venturi-tube.

The effective area of the high pressure diaphragm 71 is $k$ times the effective area of the low-pressure diaphragm 72 so that when $Q/R$ is less than the inverse sonic ratio, the diaphragm structure is urged to move to the left and when $Q/R$ exceeds the inverse sonic ratio the diaphragm structure is urged to move to the right.

Figure 6:
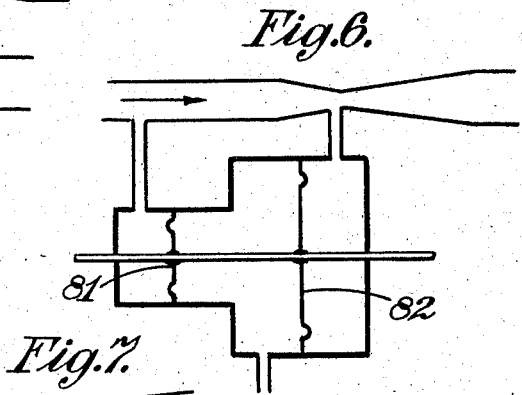

Figure 6 illustrates another embodiment of the invention which can be used when the source of higher fluid pressure is suitable for supplying the venturi i.e., $p'=Q$ and the selected ratio $m$ is greater than the inverse sonic ratio $1/k$.

In this embodiment the inlet pressure $p'=Q$ acts on on the left-hand side of the small diaphragm 81, the throat pressure $p''$ acts on the right-hand side of the large diaphragm 82, while the lower fluid pressure R acts between the two diaphragms 81, 82.

The effective area of the two diaphragms is such that the ratio of the area of the large diaphragm 82 to the area of the small diaphragm 81 is equal to $$\frac{m-1}{m.k-1}$$

so that when the ratio of Q to R is less than the preselected value $m$, the diaphragm structure will be urged to move to the right, while it exceeds $m$, the diaphragm structure will be urged to move to the left.

Figure 7:
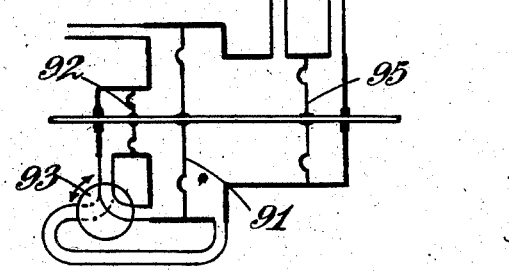

Figure 7 illustrates an embodiment of the invention for sensing when the ratio between two fluid pressures attains one of two selected ratios, the higher of the two fluid pressures being suitable for supplying the venturi-tube.

In this embodiment, the effective areas of the diaphragms 91 and 95 bear the same relation to each other as the diaphragms 51, 55 in the embodiment illustrated in Figure 3. There is however an additional diaphragm 92 subjected on the right-hand side to the lower fluid pressure R and on the left-hand side, either to the lower fluid pressure R or to the higher fluid pressure, i.e., the inlet pressure $p'$, according to the setting of the two-position cock 93.

When the cock 93 is in the position indicated by full lines in the figure, the chambers to the left and to the right of the additional diaphragm 92 are connected together so that there is no effective load tending to move the additional diaphragm 92 and the device operates in the same way as the embodiment described with reference to Figure 3.

When the cock 93 is in the position indicated by the dotted lines in Figure 7, the chamber to the left of the additional diaphragm is connected to the chamber containing fluid at the inlet pressure $p'$.

The effective area of the additional diaphragm 92 is such that the ratio of its area to the area of the diaphragm 91 is:

$$\frac{m^1-m}{m(m^1-1)}$$

which is independent of $k$. Where $k$ is the sonic ratio, $m$ the selected ratio of the two fluid pressures to which the device is sensitive when the cock 93 is in the position indicated by full lines, and $m^1$ is the selected ratio of the two fluid pressures to which the device is sensitive when the cock 93 is in the position indicated by dotted lines.

It is unnecessary for devices constructed in accordance with the invention to have a steady venturi-inlet pressure so long as the inlet pressure is sufficient to choke the throat.

It will be apparent that it would be possible to have several devices constructed in accordance with the invention connected to a common venturi tube.

One application which employs the invention to control valves bleeding air from points between the inlet and the delivery of an axial flow compressor and to control the angle of adjustable guide vanes at the inlet of the compressor will now be described with reference to Figures 8 and 9.

At low rotor speeds the inlet stages of an axial flow compressor are liable to be stalled and the stages near the discharge are liable to work at a negative angle of incidence. These conditions lead to surging of the compressor.

In order to obtain satisfactory characteristics at low rotor speeds, the compressor shown in Figures 9 is provided with bleed valves 101 which can bleed off air, and with adjustable guide vanes 102 at the inlet of the compressor which can increase the swirl velocity of the fluid at inlet so that the blades at the inlet of the compressor are less liable to be stalled. When the compression ratio approaches the designed characteristic the bleed valves must be shut and the inlet guide vanes must be adjusted to impart only the designed swirl velocity to the incoming fluid.

In order to shut the bleed valves 101 and adjust the guide vanes 102 automatically when the compression ratio of the compressor reaches a selected value, a pressure-ratio sensitive device 103 embodying the invention is employed.

Referring to Figure 8, it will be seen that the device 103 comprises a venturi 104 located in a duct 110 leading from the compressor discharge 118 directly to the atmosphere at 105. The venturi has tappings 130, 112 taken from its inlet 106 and its throat 107, one to each chamber 108, 109 on either side of a venturi diaphragm 111, the tapping 112 from the throat 107 leading to a chamber 108 between the venturi diaphragm 111 and a second larger diaphragm 113.

The chamber 114 on the other side of the second diaphragm 113 has a tapping 115 to a point 116 (Figure 9) in the compressor intermediate between the intake 117 and the discharge 118.

The two diaphragms are joined together by the connecting rod 131 and it will be appreciated that if the effective area of the venturi-diaphragm 111 is $a$ and of the second diaphragm 113 is A, while the pressure at the compressor discharge 118 is P, and, at the intermediate point 116, X; then when P is sufficient to choke the venturi, the load on the diaphragm structure will be $Pa+kP(A-a)$ in one direction, $k$ being the sonic ratio, and $XA$ in the opposite direction.

However, the ratio $P/X$ varies in accordance with the compression ratio of the compressor, and the ratio of the effective areas of the diaphragms can be chosen so that the loads in opposite directions on the diaphragm-structure are balanced, i.e., so that $P'a+kP'(A-a)=X'A$, when the ratio $P'/X'$ is in the correct relation to the selected compression ratio.

To give this balance condition, $$\frac{a}{A}=\frac{\frac{1}{k}-R}{R\left(\frac{1}{k}-1\right)}$$

where $$R=\frac{P'}{X'}$$

It will be appreciated that the device can only operate when R is less than $1/k$ so that the term $$\frac{1}{k}-R$$

is positive. Therefore the point from which the pressure X is tapped must be chosen so that, for the selected value of the compression ratio, the ratio R is less than $1/k$. If the selected value of the compression ratio is less than $1/k$, the pressure X may be tapped from the inlet of the compressor.

In order to avoid the necessity of making a fine adjustment of the position of the tapping point along the axis of the compressor, or alternatively of the areas of the diaphragms, a tapping is made between chamber 109 and chamber 114. This tapping 134 is provided with an adjusting screw 135, which, in conjunction with a restricting orifice 136 in the tapping 115 to the point 116 in the compressor, allows a small amount of air to be bled from the chamber 109 to the chamber 114 to vary the ratio of the pressures in these two chambers and hence the effective pressure ratio sensed by the unit.

When the compression ratio is below the selected value, the diaphragm-structure is loaded to move towards the venturi diaphragm end, and when the compression ratio is above the selected value, the diaphragm-structure is loaded to move towards the second diaphragm end.

The diaphragm-structure is arranged to control the bleed-valves 101 of the compressor so that they are closed when the compression ratio is above the selected value and the adjustable guide vanes 102 so that increased swirl in the direction of rotation is imparted to the incoming fluid when the compression ratio is below the selected value.

The control is indirect, and is done by a servo system of which the diaphragm structure is the controlling member.

The servo system comprises a duct 120 leading from the duct 110 to cylinders 121 in which the bleed valves 101 operate as pistons and to a cylinder 122 containing a piston 123 for adjusting the guide vanes 102.

The mouth of the duct 120 in the device 103 co-operates with a valve element 124 which is spring-urged by the spring 125 to the closed position. The valve element 124 is also connected to be operated by the piston 126 and is moved to its open position when compressed air is supplied to the cylinder 127 in which the piston is situated.

The supply of compressed air to the cylinder 127 is from the chamber 109 through the duct 128 and is controlled by the half-ball valve 129 which is mounted on the end of the connecting rod 131 so that compressed air is supplied to the cylinder 127 only when the compression ratio is above the selected value.

The piston 126 is a loose fit in its cylinder and on the side of the piston remote from the duct 128, the cylinder 127 is connected to atmosphere through the duct 132, so that when compression ratio is below the selected value and the half-ball valve 129 closes the duct 128, the compressed air trapped in the cylinder can leak past the loose fitting piston and escape to atmosphere through the duct 132. When this happens, the spring 125 moves the valve-element 124 to the closed position and thus cuts off the supply of compressed air to the duct 120. The duct 120 also communicates with the duct 132 through the passages 133, so that compressed air trapped in the duct 120 can escape when the valve-element 124 cuts off further supply of compressed air.

As mentioned above the bleed valves 101 are in the form of pistons operating in the cylinders 121, and each is connected to a tension spring 140 which, at its other end is connected to a fixed cap 141. When compressed air is not supplied to the cylinders 121, the bleed valves 101 are lifted and air from the compressor is bled out through the ports 142.

As mentioned above the guide vanes 102 are adjusted by the piston 123 in the cylinder 122. The cylinder is connected at one end with compressed air from the compressor discharge through the duct 120, and is therefore only thus supplied with compressed air when the compression ratio is above the selected value.

The other end of the cylinder 122 is connected by the duct 145 to a point 146 intermediate the inlet and the discharge of the compressor, so that whenever the compressor is running, the right-hand end of the cylinder 122 is supplied with air, from the point 146. This air will not have so great a pressure as the compressed air from the compressor discharge, so that the piston 123 will be at the right-hand end of the cylinder 122 whenever the duct 120 supplies compressed air to the cylinder, but will be at the left-hand end of the cylinder 122 when the supply of compressed air is cut off from the duct 120 and the duct 120 is vented to atmosphere.

The piston 123 is connected by a rod 150 to a crank arm 151 on the spindle 152 of the adjustable guide vane 102 so that movement of the piston adjusts the angle of the guide vane; the guide vane being arranged to impart greater swirl velocity to the fluid entering the compressor when the compression ratio is below the selected value and the piston 123 is at the left-hand end of the cylinder 122, than when the compression ratio is above the selected value and the piston 123 is at the right-hand end of the cylinder 122. A stop 153 is provided to limit the setting of the guide vane when it is imparting the greatest amount of swirl.

The guide vanes in the inlet are all simultaneously adjusted and to this end, each is provided with an arm 154 on its spindle at the lower end. Each arm 154 has a pin 155 engaging in a slot in the ring 156 which is coaxial with the compressor. When the piston 123 adjusts its associated guide vane, the ring 156 rotates about the compressor axis and thus causes the other guide vanes to be adjusted.

It should be pointed out that this embodiment can only be used if the discharge pressure of the compressor is sufficient to choke the venturi-tube 104 when the compression ratio is at the selected value.

In another arrangement, the diaphragm structure may be connected directly to a master valve which controls the supply of operating fluid for operating the bleed valves.

Alternatively, the master valve could be electrically operated, the diaphragm structure being connected to a suitable switch in the electrical circuit of the master valve.

A further application of the invention is for controlling anti-surge by-pass valves in the supercharge system of a piston engine, in which a two speed change-speed gear is incorporated in the supercharger drive. The compression ratio of the super-charger at which surge occurs will change substantially when gear-ratio is changed and a device of the kind described with reference to Figure 7 may be employed to control the operation of the anti-surge by-pass valves, the two-position cock being changed from the one of its positions to the other when the gear-ratio of the supercharger drive is changed.

The embodiments of the invention described above should in no way be taken to limit the scope of the invention, for instance, all the above embodiments have employed diaphragms, but any one of the diaphragms could equally well have been replaced by a piston.

It will be apparent that devices constructed in accordance with the invention can be more robust than devices so far employed and also that slight leakage past the displaceable wall will not seriously affect the accuracy of the device. Devices can be used accurately with any gas flowing in the venturi by being re-calibrated for each gas, but since the ratio of threat to inlet pressure does not vary greatly with different gases, sufficient accuracy for practical purposes can usually be obtained with one calibration for all gases or mixtures.

For manufacturing reasons it is convenient to split the venturi, normal to its axis, at the throat. The throat may be of parallel section, and in addition the pressure tapping may conveniently be of annular form. Variation of the dimensions of the parallel portion and of the annular gap may be made to obtain any convenient value of the sonic ratio between about 0.3 and about 0.625.

We claim:

A device for sensing when the ratio between the pressure at a source of gaseous pressure and the lower pressure at a source of fluid pressure attains a particular value comprising a venturi connected to the source of gaseous pressure and arranged and dimensioned to be choked in operation by the pressure at said source of gaseous pressure; a first chamber having as part of its wall a first displaceable wall; a first pressure tapping from said source of fluid pressure to said first chamber; a second chamber having as parts of its wall the first displaceable wall and a second displaceable wall having an effective area equal to the effective area of the first displaceable wall multiplied by the difference between the ratio of the pressure at the inlet of the venturi to the pressure at the throat of the venturi when the venturi is choked in operation and the particular value of the ratio and divided by the product of the particular value of the ratio and the difference between the ratio of the pressure at the inlet of venturi to the pressure at the throat of the venturi when the venturi is choked in operation and one; a second pressure tapping from the throat of the venturi to said second chamber; a third fluid chamber having as part of its wall the second displaceable wall; a third pressure tapping from the inlet of said venturi to said third chamber; and a movable member positively connected with said displaceable walls so as to be loaded to move by a load equal to or in a constant proportion to the difference between the sum of the loads applied to the first displaceable wall by fluid pressure in the first chamber and to the second displaceable wall by fluid pressure in the second chamber, and the sum of the loads applied to the first displaceable wall by fluid pressure in the second chamber and to the second displaceable wall by fluid pressure in the third chamber.

References Cited in the file of this patent

UNITED STATES PATENTS

| | | |
|---|---|---|
| 2,391,755 | Twyman | Dec. 25, 1945 |
| 2,398,619 | Clark et al. | Apr. 16, 1946 |
| 2,411,287 | Mock | Nov. 19, 1946 |
| 2,427,136 | Hagen et al. | Sept. 9, 1947 |
| 2,487,655 | Kellog | Nov. 8, 1949 |
| 2,507,075 | Wiegand et al. | May 9, 1950 |

FOREIGN PATENTS

| | | |
|---|---|---|
| 585,683 | Great Britain | Feb. 19, 1947 |
| 599,640 | Great Britain | Mar. 17, 1948 |